J. LAMB.
Washing and Wringing Machine.
No. 59,038.
Patented Oct. 23, 1866.
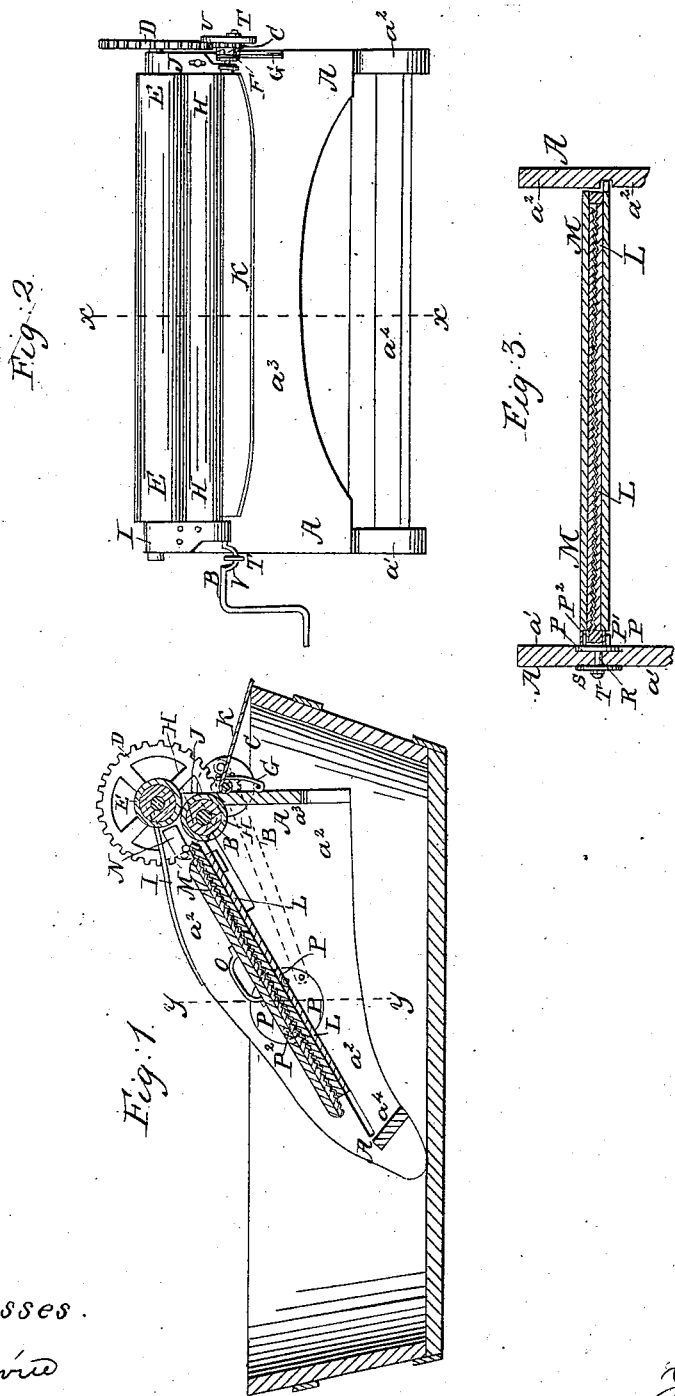
Witnesses.
J. A. Service
F. A. Jackson
Inventor.
John Lamb
Per Munn & Co
Attorneys

UNITED STATES PATENT OFFICE.

JOHN LAMB, OF JEFFERSONVILLE, NEW YORK.

IMPROVED WASHING AND WRINGING MACHINE.

Specification forming part of Letters Patent No. 59,038, dated October 23, 1866.

*To all whom it may concern:*

Be it known that I, JOHN LAMB, of Jeffersonville, in the county of Sullivan and State of New York, have invented a new and useful Improvement in Washing and Wringing Machines; and I do hereby declare that the following is a full, clear, and exact description thereof, which will enable others skilled in the art to make and use the same, reference being had to the accompanying drawings, forming part of this specification, in which—

Figure 1 is a vertical section of my improved washing and wringing machine when placed in working position in a wash-tub, taken through the line $x\ x$, Fig. 2. Fig. 2 is a rear end view of the same. Fig. 3 is a vertical section of the same, taken through the line $y\ y$, Fig. 1.

Similar letters of reference indicate like parts.

My invention has for its object to furnish an improved washing and wringing machine, so constructed and arranged that the clothes may be rubbed more or less, as may be necessary, and then wrung by the same operation; and it consists, first, in the combination of the rubbing-boards, crank-wheels, and pitmen with each other, with the crank-shaft, and with the frame of the machine; second, in the combination and arrangement of the springs, slotted stop, rollers, gear-wheels, and clutch with each other and with the frame of the machine, as hereinafter more fully described; and, third, in the combination of the rollers and rubber-boards with each other and with the frame of the machine, as hereinafter more fully described.

A is the frame of the machine, the side boards, $a^1$ and $a^2$, of which are made of such length and breadth that the machine may be placed in a wash-tub in the manner of an ordinary rubbing-board. The side boards, $a^1$ and $a^2$, are connected and held in their proper relative position by the end boards, $a^3$ and $a^4$.

B is the crank-shaft, which revolves in bearings at the end of the frame A, as shown in Fig. 2.

C is a gear-wheel revolving loosely upon the crank-shaft B, the teeth of which mesh into the teeth of the gear-wheel D, attached to the projecting end of the axle of the roller E.

F is a clutch that revolves with the revolution of the crank-shaft B, but slides back and forth along said shaft, so that it can be moved up to and away from the gear-wheel C.

G is a spring, one end of which is attached to the frame A of the machine and its other end rides in a groove formed around the clutch F. The action of this spring is to hold the clutch F up against the gear-wheel C. Upon the side of the clutch F and the side of the gear-wheel C are formed teeth, which, when the crank-shaft B is revolved in one direction, take hold of each other, and the gear-wheel C is carried around, revolving the gear-wheel D and the rollers E and H, but when the crank-shaft B is revolved in the other direction the teeth on the sides of the gear-wheel C and clutch F slide over each other, and the said gear-wheel is not revolved.

I are springs, one end of which is attached to the upper edge of the side boards, $a^1$ and $a^2$, of the frame A. Upon their other ends are formed eyes, which form the bearings for the axles of the upper roller, E.

The roller H revolves in bearings in the side boards, $a^1$ and $a^2$, of the frame A, and it is revolved by the friction of the roller E. The springs I permit the roller E to adjust itself to the thickness of the material passing between the rollers. The roller E is kept from being lifted so far away from the crank-shaft B that the teeth of the gear-wheels C and D will not mesh into each other by the stop J, which is secured to the frame A by a screw passing through a slot in said stop, as shown in Fig. 2.

The upper end of the stop J is bent over the eye of the spring I, through which the end of the axle of the roller E passes, and its lower end is bent around the crank-shaft B, so that, however much the roller E may be raised by the thickness of the clothes passing between it and the roller H, the end of the crank-shaft B may be raised the same amount, and the gear-wheels C and D kept in their proper relative positions.

K is an apron pivoted to the shaft B or to the frame A, which, when raised, rests upon the edge of the tub, and over which the clothes pass from the rollers E and H to the basket or other receptacle.

L and M are the rubbing-boards, the lower one, L, of which slides in grooves formed in the side boards, $a^1$ and $a^2$, of the frame A, and the upper one, M, slides up and down upon the upper surface of the board L, being pivoted to the side boards, $a^1$ and $a^2$, by short pins or arms, working in slots or cavities in the upper ends of the said side boards, $a^1$ $a^2$, one of which pins and slots are shown at N, Fig. 1.

O is a handle attached to the upper side of the upper rubber-board, L, by means of which the lower edge of said board may be raised when necessary.

P are crank-wheels let into the inner sides of the side board, $a^1$ and $a^2$, and attached to the inner ends of short shafts R, passing through said side boards, one of which shafts is shown in Fig. 3. To the inner sides of each of the crank-wheels P are attached two crank-pins, $p^1$ $p^2$, which enter notches in the rubbing-boards L and M and operate said boards. The notches in the rubber-board M are made deep, so that whatever thickness of clothing may be passing between the rubbing-boards, the pins $p^2$ may always enter the said notches and operate the board. To the outer ends of the short shafts R are attached crank-wheels S, one of which is shown in Fig. 3.

T are pitmen, one end of which are pivoted to the crank-wheels, and communicate to said wheels, and through them to the rubber-boards L and M S, a reciprocating movement. The other end of one of said pitmen T is pivoted to the crank-wheel U attached to the end of the crank-shaft B, and the other end of the other pitman, T, is pivoted to the double crank V, formed upon the other end of the said crank-shaft B. By turning the said crank-shaft B backward the rubbing-boards M and L will be operated while the rollers E and H stand still. This enables any part of the articles being washed to be rubbed as much as desired before they pass through the wringer. It will be observed that the rollers perform three functions: they wring the clothes, they draw them through the rubber-boards, and they feed water to the said rubber-boards.

What I claim as new, and desire to secure by Letters Patent, is—

1. The combination of the rubber-boards L M, cranks-wheels P S U, double crank V, and pitmen T with each other, with the crank-shaft B, and with the frame A of the machine, substantially as described, and for the purpose set forth.

2. The combination and arrangement of the springs I, slotted stop J, rollers E H, gear-wheels C D, and clutch F with each other and with the frame A of the machine, substantially as described, and for the purpose set forth.

3. The combination of the rollers E H and the rubber-boards L M with each other and with the frame A of the machine, substantially as herein described, and the purpose set forth.

JOHN LAMB.

Witnesses:
 ALPHEUS POTTS,
 E. H. PINNEY.